United States Patent Office 3,748,166

Patented July 24, 1973

3,748,166

ELECTROLESS PLATING PROCESS EMPLOYING SOLUTIONS STABILIZED WITH SULFAMIC ACID AND SALTS THEREOF

Leon A. Kadison and Eileen Maguire, Pasadena, Calif., assignors to Crown City Plating Company, El Monte, Calif.

No Drawing. Continuation-in-part of application Ser. No. 118,480, Feb. 24, 1971. This application Sept. 6, 1972, Ser. No. 286,838

Int. Cl. C23c 3/02

U.S. Cl. 117—47 A 6 Claims

ABSTRACT OF THE DISCLOSURE

A process in which sulfamic acid and its salts are used to stabilize alkaline electroless copper plating solutions against decomposition. When employed in the second bath of a two-bath electroless plating system, the presence of sulfamic acid and its salts permits rapid deposition, over a broad range of concentrations, of copper onto an initial copper or nickel plate, while preventing deposition of copper onto a noble metal catalyzed surface. The stabilizers also serve to supplement single-bath electroless copper plating processes.

BACKGROUND OF THE INVENTION

This is a continuation-in-part of our application Ser. No. 118,480, filed Feb. 24, 1971, now abandoned.

The present invention relates to the electroless plating of resin surfaces and, more particularly, to inhibiting an electroless copper plating bath against solution decomposition due to impurities.

Considerable demand has developed for metal plated non-conductive articles, particularly plastic articles. In the finished product, the desirable characteristics of both the plastic and the metal are combined to offer thereby the technical and aesthetic advantages of each.

Although most resins are elctrically non-conductive, a metal bond to the surface of the resin can be established by an initial plating operation known as "electroless plating." This is typically accomplished by conditioning the surface of the resin for plating by contact with a strong oxidizing acid, seeding the conditioned surface by contact with a noble metal salt, e.g., a palladium chloride solution, then immersing the seeded surface in an autocatalytic electroless plating solution wherein an initial coating of an conductive metal is established by chemical deposition. The metal coating formed acts as a buss and allows a thicker metal coating to be built up electrolytically. For most resins, contact with the oxidizing acid is often preceded by a chemical etch to improve the bond strength of the plate.

A typical formulation for an electroless plating solution consists essentially of a soluble cupric salt, such as copper sulfate; a complexing agent for the cupric ion, such as Rochelle salt; an alkali hydroxide for adjusting pH; a carbonate radical as a buffer; and a reducing agent for the cupric ion such as formaldehyde.

The mechanism by which polymeric objects having surfaces catalyzed by palladium metal may be plated autocatalytically has been well described in the literature, such as, for example, U.S. Pat. 2,874,052.

Electroless plating solutions as described above are, however, subject to decomposition. For copper plating solutions, for example, the cupric ion inherently tends to reduce to the insoluble cuprous form. This may be overcome, in part, by the use of stabilizers, or by air agitation which serves to oxidize cuprous ion back to the cupric state.

Secondary sources of contamination, however, also materially contribute to decomposition. When the catalyzed plastic article is withdrawn from the noble metal salt bath, it too often carries with it, as "drag-out," substances including copper, nickel, iron, palladium, gold, silver and even dust particles, which are catalytic toward solution decomposition. Palladium ion ($Pd^{++}$) is notorious in that if stainless steel tanks or equipment are in contact with electroless (copper) bath even a minute amount of palladium ion will initiate plating of the copper onto steel. In addition, concentrations as low as one part per million will cause spontaneous decomposition of the solution with attendant precipitation and loss of copper.

It has been proposed to use plastic lined tanks for electroless plating baths to avoid the problem of plating on the stainless steel tanks. Even in plastic lined tanks, however, inevitable scratches in the lining result in initiation of decomposition because the scratches provide recesses within which hydrogen produced during the plating reaction is concentrated.

Attempts have also been made to stabilize electroless plating baths to minimize decomposition. However, most compounds which have been proposed as stabilizers retard the rate of electroless plating. While heating may be employed to increase the rate of deposition, it has not been generally used because heating also promotes decomposition.

We have employed an alternate route to minimize loss of valuable chemicals through decomposition of the plating solutions. This involves the use of two plating baths. One is a strike bath in which a noble metal catalyzed surface is initially plated in a bath essentially free of inhibitors or inhibited only to a minor extent. The other is a plating bath in which the article with a thin deposit of plating metal is further electrolessly plated and which is inhibited by a cyanide to the extent that if the article having the catalytic noble metal surface were passed directly into the bath without first passing through the strike bath, no plating metal would be deposited on the article. In this system, the plating bath remains stable for extended periods of time while the strike bath continuously decomposes. Since the volume of the strike bath is low relative to the volume in the plating bath, losses have been minimized. The cyanide inhibitor, however, retards deposition rate as its concentration increases.

SUMMARY OF THE INVENTION

It has now been found that sulfamic acid and the salts thereof serve as unusually effective stabilizers for alkaline electroless copper plating solutions.

They are preferably employed in the second or "plating" bath of a two-bath electroless plating system. In that bath the presence of sulfamic acid and/or its salts may at molar concentrations as low as 0.02 mol per liter of solution inhibit the solution to prevent decomposition while preventing deposition of copper onto a noble metal catalyzed surface, but permitting rapid deposition of copper onto an article having an initially deposited coat of a plating metal.

In addition, sulfamic acid and/or its salts may be employed alone or in conjunction with other inhibitors to stabilize the "strike" bath of two-bath electroless plating systems, as well as conventional alkaline electroless copper or nickel solutions against spontaneous breakdown due to the presence of contaminants such as noble metal ions without materially reducing plating rate onto a noble metal catalyzed surface.

DESCRIPTION

The present invention relates to the use of sulfamic acid and its salts as stabilizers for electroless plating solutions, particularly as stabilizers for the second or "plating" bath of a two-bath electroless plating system. They may be employed alone or in conjunction with other known stabilizers.

Sulfamic acid is a white crystalline solid, having the formula $HSO_3NH_2$, which may be converted to its corresponding salt by reaction with a base, a metal salt, or an amine to form a compound having the formula $X(SO_3NH_2)_n$ wherein X is the cation contributed by the base, metal salt, or amine, and $n$ is valence of the cation. The cation, of course, must not have a deleterious effect upon the formulated electroless plating solution.

In addition to the ammonium and amine cations, such as diethylenetriamine and diethanolamine, there may be employed as the metallic cations for the sulfamic acid salts, metals selected from Groups I*a*, II*a*, II*b*, III*b*, V*a*, VI*a*, and the third period of Group VIII of the Periodic Table as defined by Mendeléeff and published as the "Periodic Chart of the Atoms," by W. N. Welch Manufacturing Company.

While nowise limiting, the preferred metals are lithium, sodium, potassium, barium, nickel, zinc, magnesium, calcium, strontium, vanadium, chromium in the trivalent state, molybdenum, tungsten, cadmium, mercury, aluminum, cobalt, and copper.

The metals to be specifically avoided are lead and the noble metals, as they are considered poisons in electroless plating solutions as well as other metals which may be considered contaminants in the solution.

The salts of sulfamic acid may be prepared by neutralization with a metal or ammonium hydroxide, as well as by direct reaction with an amine or a salt of the metal cation.

Although finding broad utility as a stabilizer for electroless plating solutions, sulfamic acid and its salts are of particular utility as stabilizers for alkaline electroless copper "plating" bath of a two-bath electroless plating system.

The two-bath system is most commonly based on a copper or nickel "strike" bath where an initial plate of metal is deposited, followed by immersion of the article in an alkaline electroless copper "plating" bath where a plate of copper is built up.

Formulations which are particularly useful as an alkaline copper based "plating" bath of a two-stage electroless plating system lie within the following ranges:

| Component: | Molar concentration |
|---|---|
| Soluble cupric salt | 0.02–0.15 |
| Complex agent for cupric ion | 0.03–0.75 |
| Reducing agent | 0.025–1.5 |
| Sulfamic acid (salts) | 0.02–4.5 |
| Alkali hydroxide, to pH of 11–14. | |
| Water, sufficient to make 1 liter. | |

The preferred concentration of sulfamic acid and/or its salts in the "plating" solution is from about 0.3 to 4.5 mols per liter.

As the water soluble cupric salt there may be employed copper sulfate, cupric halides, cupric nitrates, cupric acetates, and other inorganic and organic cupric salts. Copper sulfate and cupric chloride are preferred.

As complexing agents for the cupric ion there may be employed Rochelle salts, the mono-, di-, tri- and tetrasodium salts of ethylenediaminetetracetic acid; the ethanolamines, such as triethanolamine; nitrilotriacetic acid and its alkali metal salts; gluconic acid; gluconates; glucono-γ-lactone; N-hydroxyethylene ethylenediaminetriacetate; hydroxyalkyl substituted dialkylene triamines, such as pentahydroxypropyl diethylenetriamine; the salicilates; citrates; lactones, and other complexing agents well known in the art.

As reducing agents there may be employed formaldehyde and its precursors or derivatives such as paraformaldehyde; glyoxyl; borohydrides, such as alkali metal borohydrides and substituted alkali metal borohydrides and the like. Formaldehyde is particularly preferred.

There may also be employed buffering agents such as sodium bicarbonate.

It will be appreciated from the above formulations that, if sulfamic acid is added directly, it will, in substance, be converted to an ionized alkali metal salt as a consequence of the presence of the alkali hydroxide for pH control.

Plating solutions corresponding to the above formulations will inhibit against the plating of copper on a surface catalyzed with a noble metal, but will permit deposition onto a previously plated surface as produced in the "strike" bath hereinafter described.

The above plating solutions are capable of building an initial metal plate to a level sufficient to act as a buss for electroplating within 5 to 10 minutes at temperatures of about 105° F. The solutions are, moreover, useful over a temperature range from about 75° F. to about 150° F., preferably from about 90° F. to about 115° F.

As indicated, when the sulfamic acid solutions of this invention are used as the "plating" bath of a two-stage operation, the resin articles to be plated are provided with an initial plate in a "strike" bath which is either free of inhibitors or only inhibited to an extent such that plating onto a surface catalyzed with a nobel metal will not be precluded. The "strike" baths employed are generally those capable of depositing an initial coat of metal onto the surface of a noble metal catalyzed article within three minutes at room temperature.

The compositions used in the "strike" bath may be any of those conventionally employed for electroless deposition of plating metal on a nonconductive article. Any conventional electroless copper plating solution may, for instance, be used as a room temperature "strike" bath. Formulations for an electroless copper "strike" bath include, for example, the following compounds in aqueous solution within the ranges set forth below:

| Ingredient: | Molar concentration |
|---|---|
| Soluble cupric salt | 0.02–0.15 |
| Complexing agent | 0.03–0.75 |
| Reducing agent | 0.05–1.50 |
| pH adjustor (alkali hydroxide), sufficient to give pH from 12 to 14. | |

The nature of the soluble cupric salts, complexing agents, and reducing agents which may be used are the same as those employed in the "plating" bath as set forth above.

Since only a thin film of copper is deposited in the strike bath, its volume can be small, so that the solution can be economically replenished or discarded as decomposition occurs. For this reason, the strike bath can be operated without any inhibitor or a small amount of inhibitor for which sulfamic acid and its salts may serve as all or part of the inhibitor system.

Similar solutions are employed when it is desired to deposit an initial nickel plate except that there is employed a soluble nickel salt.

For convenience, the detail of the use of the sulfamic stabilized plating solutions of the present invention will be made with reference to electroless copper plating of acrylonitrile-butadiene-styrene, referred to below as ABS plastic with copper. The conditioning and activation of the plastic are described in general, as these steps are not, as such, a part of the invention.

A molded ABS plastic part is cleaned, pre-etched with an organic chemical solvent, if required, and then etched in an etching chemical bath such as a mixture of chromic and sulfuric acids. After cleaning of the etched article, including rinsing in an alkaline cleaner, the article is sensitized in a stannous chloride-hydrochloric acid bath and then activated in a bath of a noble salt, such as palladium chloride, to provide a catalytic noble metal on the surface of the plastic. Following rinsing to remove excess palladium from the surface of the article, it is passed into the strike bath.

The strike bath can be any conventional electroless plating solution. For copper plating the preferred solutions have the following formulation:

| Ingredient: | | Concentration |
|---|---|---|
| Rochelle salt | grams/liter | 34 |
| Caustic soda | do | 12 |
| Copper sulfate | do | 7 |
| Sodium carbonate | do | 6 |
| Formaldehyde | cc./liter | 25 |
| Water, sufficient to make 1 liter. | | |

The "strike" bath is typically maintained at room temperature. The plastic article with palladium metal on its surface is immersed in the strike bath for from about 30 seconds to about 3 minutes and then removed. This is a sufficient period of immersion to enable deposition of a thin copper film over the entire surface of the article. The "strike" bath, in addition to preparing the article for deposition in the electroless "plating" bath, also serves as a collector for the bulk of the contaminants which otherwise would pass directly into the plating bath.

Upon removal from the strike bath, the plastic article having a thin copper deposit is passed directly into the sulfamic acid stabilized alkaline electroless copper plating bath.

The plastic article is retained in the alkaline electroless plating bath for a period of from 5 to 10, preferably 3 to 6 minutes. During this period of time, additional thicknesses of copper sufficient to permit subsequent electrolytic metallic plating are deposited. After removal from the electroless plating bath, the article is rinsed and soaked and, if electrolytic plating is required, is passed to the electroplating process.

While sulfamic acid and its salts are particularly useful as stabilizers for the above described two-step electroless plating processes, they are also useful as stabilizers for one-step electroless nickel plating processes and as the sole or as supplemental stabilizers for single-bath electroless copper plating processes.

When used as a stabilizer or inhibitor for single-bath electroless copper plating solutions, sulfamic acid and/or its salts may be employed, depending on the plating potential of the bath, in an amount up to about 0.5 mol per liter. "Plating potential" of a bath is dependent, in general, on the concentration of reducing agent and alkali metal hydroxide. At a higher end of the concentrations set forth above, sulfamic acid may be added as a stabilizer without causing the bath to become a "plating" bath, that is, one incapable of depositing copper onto a noble metal catalyzed surface.

As plating potential goes down, however, at a constant concentration of sulfamic acid and/or its salts, the bath will, at some concentration of reducing agent and alkali metal hydroxide, become a "plating" bath.

The test to determine this is, however, simple, requiring only immersion of a noble metal catalyzed article into a formulated solution to determine if plating will occur onto its surface. If so, then the solution is functional as a "strike" bath or single-bath alkaline copper plating solution. If a deposit of copper does not occur, then the solution is functional as a "plating" bath for a two-bath plating system.

Examples 1 to 5

Several plating solutions were formulated containing varying amounts of copper sulfate and sulfamic acid as the stabilizer. As a control, there was formulated a solution without a stabilizer. The solutions are shown in Table I.

TABLE I

| Component (mols/liter) | 1 | 2 | 3 | 4 | 5 | Control |
|---|---|---|---|---|---|---|
| Copper sulfate | 0.036 | 0.036 | 0.036 | 0.036 | 0.036 | 0.036 |
| Rochelle salt | 0.14 | 0.14 | 0.14 | 0.14 | 0.14 | 0.14 |
| Formaldehyde | 0.11 | 0.027 | 0.027 | 0.80 | 1.30 | 0.11 |
| Sodium bicarbonate | 0.11 | ------- | 0.11 | 0.11 | 0.11 | 0.11 |
| Sulfamic acid | 0.51 | 0.022 | 0.037 | 2.2 | 4.35 | -------- |
| Sodium hydroxide, total | 0.88 | 0.392 | 0.407 | 2.96 | 5.39 | 0.37 |
| Free sodium hydroxide | 0.125 | 0.125 | 0.125 | 0.51 | 0.79 | 0.125 |

In each instance, the balance of the solution was an amount of water sufficient to make one liter.

With respect to solutions 1 to 5 after immersing ABS resin articles having a noble metal catalyzed surfaces in the baths maintained at 105° F. for 15 minutes, no preceptible copper deposit was visible upon removal.

When articles which had been provided with an initial plate of copper in a strike bath were immersed, a film of copper sufficient to act as a buss for electrolytic plating was deposited within 5 to 10 minutes.

Samples of the solutions were then used as plating baths for 5 minutes and then allowed to stand for 12 hours. No perceptible decomposition was observed.

For the control, the solution was used as a plating bath for a catalyzed resin surface for 5 minutes at 105° F. and then allowed to stand. It decomposed with attendant precipitation of copper within 30 minutes.

Example 6

There was employed as a plating bath a solution of the following composition.

| Component: | | Amount |
|---|---|---|
| Versene® 100 [1] | cc | 40.0 |
| $CuSO_4 \cdot 5H_2O$ | gr | 9.5 |
| Sodium sulfamate [2] | gr | 65.0 |
| Sodium hydroxide | gr | 9.0 |
| Sodium bicarbonate | gr | 9.3 |
| Formalin [3] | cc | 9.0 |
| Free sodium hydroxide | gr | 5.0 |
| Water, sufficient to make 1 liter. | | |

[1] An about 40% aqueous solution of the tetrasodium salt of ethylenediaminetetracetic acid manufactured by the Dow Chemical Corporation.

[2] A salt prepared by neutralizing sulfamic acid with sodium hydroxide.

[3] A 38% solution of formaldehyde in water.

While maintaining the bath at 105° F., a molded ABS plaque suitably etched, sensitized by immersion in a stannous chloride-hydrochloric acid bath and activated in a palladium chloride bath, was immersed for 5 minutes. No deposition of copper onto the plaque occurred.

However, when a plaque an initial "strike" coat of copper was immersed in the bath, there was continued an electroless deposit of copper onto the plaque.

Example 7

In this example the electroless "plating" bath had the following composition:

| | | |
|---|---|---|
| Triethanolamine | cc | 10 |
| $CuSO_4 \cdot 5H_2O$ | gr | 9.5 |
| Sodium sulfamate | gr | 24.5 |
| Formalin | cc | 10.0 |
| Sodium bicarbonate | gr | 6.0 |
| 50% aqueous caustic soda | cc | 11.0 |
| Water, sufficient to make 1 liter. | | |

With the bath maintained at a temperature of 110° F. the plating procedure of Example 6 was repeated. Identical results were obtained.

Example 8

In this example the stabilizer for the electroless "plating" bath was made by forming an aqueous solution of 5 grams of sulfamic acid and 3.5 cc. diethylenetriamine. The resultant aqueous solution of the diethylenetriamine-sulfamic acid salt had a pH of 7.5. The balance of the plating bath was as follows:

| | | |
|---|---|---|
| 50% aqueous solution of NaOH | cc | 19.4 |
| Sodium bicarbonate | gr | 9.3 |
| Rochelle salt | gr | 40.0 |
| $CuSO_4 \cdot 5H_2O$ | gr | 9.5 |
| Formalin | cc | 10.0 |
| Water, sufficient to make 1 liter. | | |

In preparing the bath the sodium hydroxide, sodium bicarbonate and Rochelle salt were dissolved in water and added to the solution of diethylenetriamine and sulfamic acid prior to the addition of the cupric sulfate, which was also dissolved in water, and Formalin to the resulting mixture. While maintaining the bath at a temperature of 100° F. the plating procedure described in Example 6 was repeated. The results were identical in that no plating occurred on the noble metal catalysed surface but plating occurred on plaque having an initial deposit of copper as provided by a "strike" bath.

Example 9

The "plating" solution employed was identical to that described in Example 8 except that the stabilizer was a diethanolamine salt of sulfamic acid. The stabilizer was prepared by dissolving 10 grams of sulfamic acid and 11.5 cc. of diethanolamine in water. The resultant aqueous mixture of the salt had a pH of 7.5.

While maintaining the bath at ambient temperature the plating operation of Example 6 was repeated. Identical results were obtained.

Example 10

A stabilizer for a plating solution was prepared by dissolving 20 grams of sulfamic acid and 20.34 grams of barium carbonate in water and agitating the mixture until all signs of reaction ceased. To the barium sulfanate solution there was added the following ingredients.

| | | |
|---|---|---|
| Versene ® 100 | cc.. | 85 |
| 50% aqueous solution of NaOH | cc.. | 10 |
| Rochelle salt | gr.. | 40 |
| $CuCl_2 \cdot 2H_2O$ | gr.. | 6.48 |
| Formalin | cc.. | 10.0 |

Water, sufficient to make 1 liter.

The resultant plating bath had a free sodium hydroxide content of 6.6 gr./l. While maintaining the bath at 105° F., the plating procedure described in Example 6 was repeated. Identical results were obtained.

Example 11

Nickel sulfamate was prepared by dissolving 15.27 grams nickel carbonate and 25 grams sulfamic acid in water. The mixture was agitated until all signs of reaction ceased. The solution of nickel sulfamate was the stabilizer for a plating bath, the balance of which was formulated from the following components:

| | | |
|---|---|---|
| Versene ® 100 | cc.. | 115 |
| 50% aqueous solution of NaOH | cc.. | 6.75 |
| $CuSO_4 \cdot 5H_2O$ | gr.. | 9.5 |
| Formalin | cc.. | 10 |

Water, sufficient to make 1 liter.

When the solution was employed at room temperature and plating procedure of Example 6 was repeated, identical results were obtained.

Example 12

To 20 grams of sulfamic acid dissolved in 100 cc. water there was added 27.4 grams lead carbonate. The resulting mixture was stirred until all reaction ceased. 29.64 grams of zinc sulfate was then added to the mixture. After permitting the mixture to stand for 1 hour there was formed a precipitable of lead sulfate which was filtered from the solution. The filtrate consisting of an aqueous solution of zinc sulfamate and having a theoretical zinc sulfamate content of 26.75 grams was used as the stabilizer in a plating solution of the following additional constituents:

| | | |
|---|---|---|
| Versene ® 100 | cc.. | 75 |
| 50% aqueous solution of NaOH | cc.. | 19.4 |
| Sodium bicarbonate | gr.. | 9.3 |
| Rochelle salt | gr.. | 97.0 |
| $CuSO_4 \cdot 5H_2O$ | gr.. | 9.5 |
| Formalin | cc.. | 10 |

Water, sufficient to make 1 liter.

The resultant bath had a free caustic content of 5 grams per liter. While maintaining the bath at 85° F. the plating procedure described in Example 6 was repeated. Identical results were obtained.

Example 13

An aqueous alkaline copper solution containing 7.5 grams per liter $CuSO_4 \cdot 5H_2O$, 28 grams per liter Rochelle salt, 9.5 grams per liter sodium carbonate, 12 grams per liter free sodium hydroxide, 10 grams per liter of the sodium salt of sulfamic acid and 26 cc. per liter Formalin was prepared.

Two plaques molded from Cycoloc® EP–3510, a plating grade of ABS resin manufactured and sold by the Marbon Division of Borg-Warner Corporation were subjected to an etch in a chromic acid solution and then immersed in a catalyst solution containing colloidal palladium, known as Cuposit® 9–F and then into Cuposit® Accelerator 19, both manufactured by the Shipley Company and disclosed in U.S. Pat. 3,011,290 to form an ABS substrate which would accept an electroless copper deposit.

Following activation the plaques were rinsed in deionized water to remove any residue of catalyst and accelerator solutions from the surface.

The plaques were immersed into the aqueous alkaline copper solution for 10 minutes. A uniform plate of copper was deposited. After plating both plaques, the bath was allowed to remain overnight with continual agitation. After that period of time no solution decomposition was observed.

Example 14

There was prepared an electroless copper bath of the following composition:

| | | |
|---|---|---|
| $CuSO_4 \cdot 5H_2O$ | gr.. | 9.5 |
| 50% aqueous solution of NaOH | cc.. | 26.0 |
| Sodium bicarbonate | gr.. | 9.3 |
| Rochelle salt | gr.. | 39.0 |
| Sodium sulfamate | gr.. | 36.8 |
| Formalin | cc.. | 20.0 |

Water, sufficient to make 1 liter.

The free sodium hydroxide content of the bath was 9.75 grams per liter. Using a plaque catalyzed in the manner described in Example 14 there was formed a sufficient deposit of copper onto the noble metal catalyzed surface after 10 minutes to form a plate sufficiently thick to act as a buss for electrolytic plating. Bath temperature was 85° F.

Example 15

There was prepared an aqueous electroless nickel "strike" solution of the following composition:

$NiCl_2 \cdot 6H_2O$ 12 gr./l.; citric acid 16 gr./l.; ammonium hydroxide 15 cc./l.; ammonium carbonate 25 gr./l.; diethanolamine 10 cc./l.; hydrated sodium hypophosphite 20 gr./l., the balance being water. Solution pH was 8.5.

A plaque catalyzed in the manner described in Example 13 was immersed in the bath which was maintained at a temperature of 105° F. for 1.5 minutes. There was deposited an initial electroless nickel plate. The plaque was removed from the bath, rinsed and immersed in a "plating solution" having the following composition:

$CuSO_4 \cdot 5H_2O$ 9.5 gr./l.; sodium bicarbonate 9.4 gr./l.; Rochelle salt 39.0 gr./l.; free sodium hydroxide 5.0 gr./l.; formaldehyde (Formalin) 8 cc./l., and the sodium salt of sulfamic acid to provide sulfamic acid in an amount equivalent to 50 gr./l., the balance of the solution being water.

Immersion in the "plating solution" was for 5 minutes at a solution temperature of 105° F.

A plate of copper deposited on the initial nickel plate.

Example 16

The procedure of Example 15 was repeated except there was used as the "strike" solution the solution described in Example 13. Immersion was for 2 minutes at ambient temperature. In addition the plaque was not rinsed after removal from the "strike" bath. Following removal from the "strike" bath, the plaque was immersed in the "plating" solution described in Example 15. After 10 minutes a plate of copper sufficient to act as a buss for electrolytic plating was deposited.

What is claimed is:

1. In an electroless plating process wherein an article having a catalytic noble metal on its surface is immersed in a first electroless plating solution for a time sufficient to at least deposit a thin coating of plating metal from said solution then immersed in an aqueous alkaline electroless copper plating solution containing at least one water soluble cupric salt, at least one complexing agent for cupric ions, at least one reducing agent for cupric ions and a pH adjustor to maintain the solution at a pH of from 11 to 14 and an inhibitor in a concentration sufficient to prevent deposition of copper onto a catalytic noble metal but insufficient to prevent deposition of copper onto the plating metal, the improvement comprising maintaining in said copper plating solution a sulfamic acid compound selected from the group consisting of sulfamic acid, salts of sulfamic acid and mixtures thereof as an inhibitor for the aqueous alkaline copper plating solution.

2. A process as claimed in claim 1 in which the article is plastic.

3. A process as claimed in claim 1 in which the sulfamic acid compound concentration in said aqueous alkaline electroless copper plating solution is from about 0.02 to 4.5 mols per liter.

4. A process as claimed in claim 1 in which the sulfamic acid compound concentration in said aqueous alkaline electroless copper plating solution is from about 0.3 to 4.5 moles per liter.

5. A process as claimed in claim 1 in which said aqueous alkaline electroless copper plating solution is maintained at a temperature of from about 75° F. to about 150° F.

6. A process as claimed in claim 1 in which said aqueous alkaline electroless copper plating solution is maintained at a temperature of from about 90° F. to about 150° F.

References Cited

UNITED STATES PATENTS 3,431,120 3/1969 Weisenberger ---------- 106—1

LORENZO B. HAYES, Primary Examiner

U.S. Cl. X.R.

106—1; 117—71 R, 130 E